United States Patent

Stroetgen et al.

[11] Patent Number: 5,311,089
[45] Date of Patent: May 10, 1994

[54] HAND MACHINE TOOL

[75] Inventors: Eckerhard Stroetgen, Waldenbuch; Eberhard Prahst, Aichwald, both of Fed. Rep. of Germany

[73] Assignee: Robert Bosch GmbH, Stuttgart, Fed. Rep. of Germany

[21] Appl. No.: 51,462

[22] Filed: Apr. 22, 1993

[30] Foreign Application Priority Data

Jun. 19, 1992 [DE] Fed. Rep. of Germany ........ 4220078

[51] Int. Cl.$^5$ ........................... H02K 7/14; H02K 9/00
[52] U.S. Cl. .......................................... 310/50; 310/58
[58] Field of Search ........................ 310/50, 58, 62, 63, 310/40 MM, 67 R, 254, 60 R, 47, 173

[56] References Cited

U.S. PATENT DOCUMENTS 2,604,501  7/1952  Wightman ............................ 310/63
4,698,542 10/1987  Muller ................................ 310/67 R

FOREIGN PATENT DOCUMENTS 3942083  6/1991  Fed. Rep. of Germany .

Primary Examiner—Emanuel T. Voeltz
Assistant Examiner—g232 1 To
Attorney, Agent, or Firm—Michael J. Striker

[57] ABSTRACT

A hand machine tool has an electric motor, a radial fan driven by the electric motor and having an aspirating region and a stationary pre-spin grate located in the aspirating region of the radial fan directly upstream the radial fan as considered in an air flow direction and formed so that a supply air to the radial fan is deviated against a rotary direction of the radial fan.

13 Claims, 2 Drawing Sheets

HAND MACHINE TOOL

BACKGROUND OF THE INVENTION

The present invention relates to a hand machine tool which has an electric motor with a stationary stator and a radial fan with fan vanes accommodated in a machine tool housing.

In such electric machine tools there is a need, due to the augmentation of the pressure increase and volume stream of the radial fan for heat withdrawal from the electric motor, to cool the electric motor and other thermally loaded components in the machine tool housing better so as to increase an output.

One of known electrical hand machine tools of the above mentioned type is disclosed in the German document DE 39 42 083 A1. The machine tool is provided for this purpose with a smaller axial fan arranged before the radial fan and rotating synchronously with the latter. Its fan wheel is arranged between the radial fan and the electric motor on the motor shaft and is located immediately before the radial fan in its aspiration region.

SUMMARY OF THE INVENTION

Accordingly, it is an object of the present invention to provide a hand machine tool, which is a further improvement of the existing hand machine tools of this type.

More particularly, it is an object of the present invention to provide a hand machine tool in which an augmentation of the pressure increase and the volume stream of the radial fan can be obtained up to 25% with structurally simple means which does not interfere with mounting and adjustment.

In keeping with these objects and with others which will become apparent hereinafter, one feature of the present invention resides, briefly stated, in a hand machine tool of the above mentioned type in which immediately before the radial fan in an air flow direction and in its aspiration region, a stationary pre-spinning grate is arranged so that the supply air to the radial fan is deviated from the direction of rotation of the fan.

The pre-spinning grate can be formed simply as an injection molded part of a synthetic plastic material. It can be produced together with a cover ring required for the air guidance in the radial fan in a single working step. The mounting thereby does not require additional time due to the connection of the cover ring in the machine housing. Since with the mounting of the cover ring simultaneously the pre-spinning grate is positioned in a corresponding position and reliably held. No machining of the motor shaft which is required for mounting of known axial fans is needed in the hand machine tool in accordance with the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
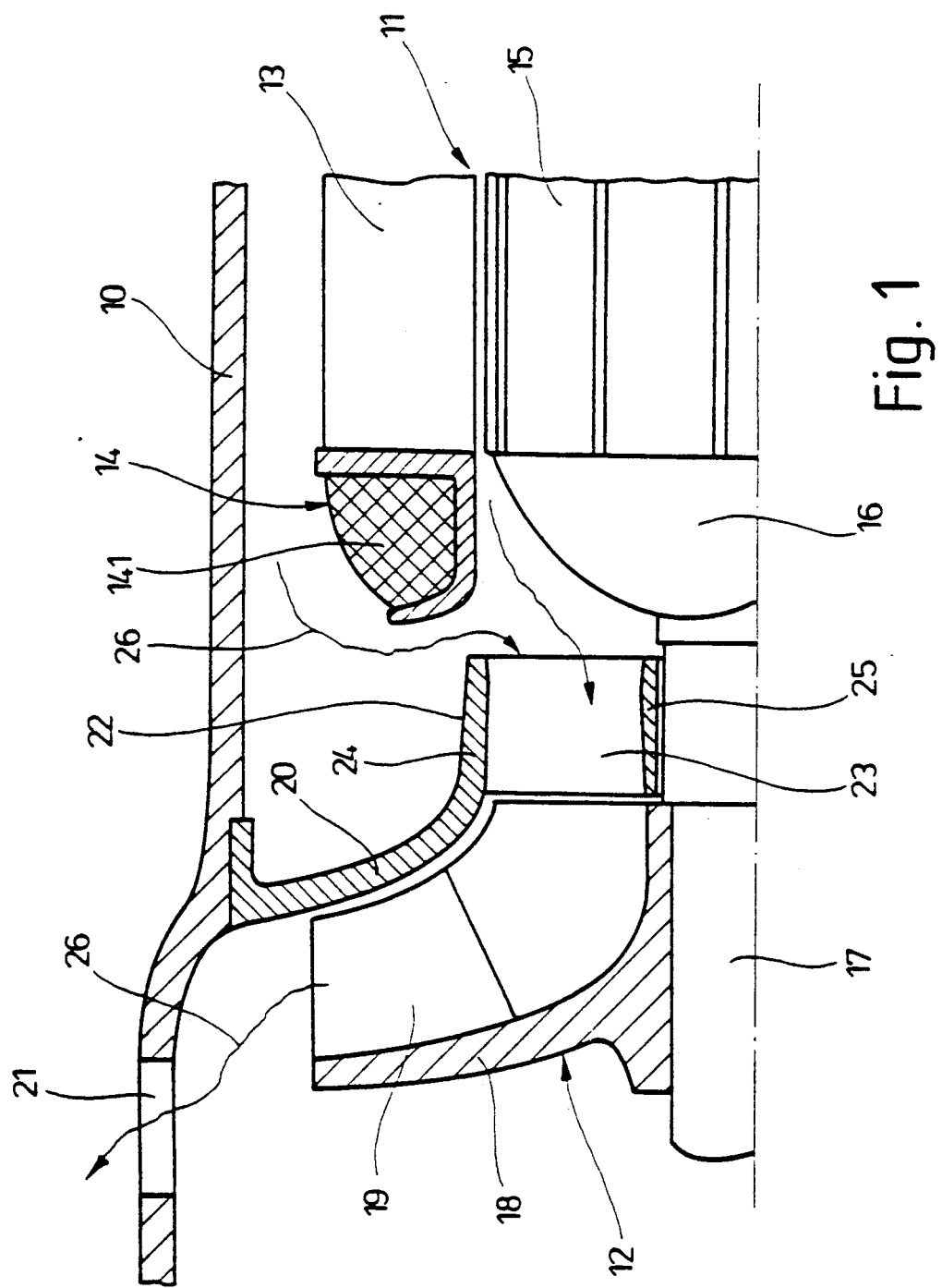
FIG. 1 is a view showing a partial longitudinal section of a hand machine tool in accordance with the present invention.

A hand machine tool shown in a longitudinal section in FIG. 1 can be formed as an electric drilling machine, an electric angular grinder, an electric hand saw, and the like. It has a machine housing 10, and an electric motor 11 with a radial fan 12 accommodated in the machine housing. The electric motor 11 is formed as a commutator motor and has a stationary stator 13 with a stator winding 14 and a rotor 15 which rotates around the stator 13 and has a rotor winding 16. The rotor is mounted together with the radial fan 12 on a motor shaft 17 for joint rotation with the latter. The motor shaft 17 is rotatably supported in the machine housing 10 and forms a drive shaft for the tool. The radial fan 12 is located at the side of the electric motor 11 which faces away of the commutator.

The radial fan 12 with an axial air aspiration region and a radial air outlet region is composed in a known manner of a carrier disc 18 which is fixedly connected with the motor shaft 17 for joint rotation therewith, and a plurality of fan vanes 19 which extend in an axial direction. The vanes are located in a radial plane which extends through the axis of the motor shaft 17 and are two-dimensionally curved relative to the radial plane. The fan vanes 19 are covered at their end side which faces the aspiration region with a stationary cover ring 20 fixedly connected with the machine housing 10. Air flow passages are formed by the carrier disc 18 and the cover ring 20 between the individual fan vanes 19. Thereby a pressure increase of the air which flows out from the radial fan 12 is possible. Air outlet slots 21 are arranged near the air outlet side of the radial fan 12 in the machine housing 10. They extend in the axial direction of the machine housing 10. The surface normals of the air outlet slots 21 are oriented substantially radially.

For further pressure increase and increase of the air stream which flows through the radial fan 12, a special stationary pre-spinning grate 22 is arranged directly before the radial fan 12 in its aspiration region which is closed to the motor shaft. The pre-spinning grate 22 is formed so that the air which flows through the pre-spinning grate 22 is deviated from the rotary direction of the radial fan 12 as identified with arrow 27 in FIG. 2. For this purpose the pre-spinning grate 22 has a plurality of air guiding vanes 23 which are offset relative to one another by an identical circumferential angle and extend substantially radially. The vane planes of the air guiding vanes 23 are arranged at an acute angle with respect to the radial plane which extends along the axis of the motor shaft.

The air guiding vanes 23 are held between an outer ring 24 and an inner ring 25 which is concentric to the outer ring. The inner ring 25 surrounds the motor shaft 17 with a small radial distance, while the outer ring 24 is mounted on the cover ring 20 of the radial fan 12 and axially projects from it. The number of the air guiding vanes 23 of the pre-spinning grate 22 is between 6 and 12. The air guiding vanes 23 are arranged with gaps, or in other words an observer who looks in the axial direction onto the pre-spinning grate 22 can see through between two neighboring air guiding vanes 23. These "gaps" are advantageous for spacing of both tool halves in a purely axial direction after the injection molding. The diameter of the outer ring 24 substantially corresponds to the diameter of the rotor 15 and the whole pre-spinning grate 22 extends closely to the winding head 141 of the stator winding 14. The pre-spinning grate 22 is composed preferably of synthetic plastic material and made of one piece with the cover ring 20. Therefore for mounting of the radial fan 12 on the machine housing only one component is provided.

The cooling air stream produced by the radial fan 12 is aspirated through the collector and the active motor parts, flows through the pre-spinning grate 22, then through the vane passages formed in the radial fan 12, and exits the machine housing 10 through the air outlet slots 21. The cooling air flow is identified in FIG. 1 with the arrow 26.

Figure 2:
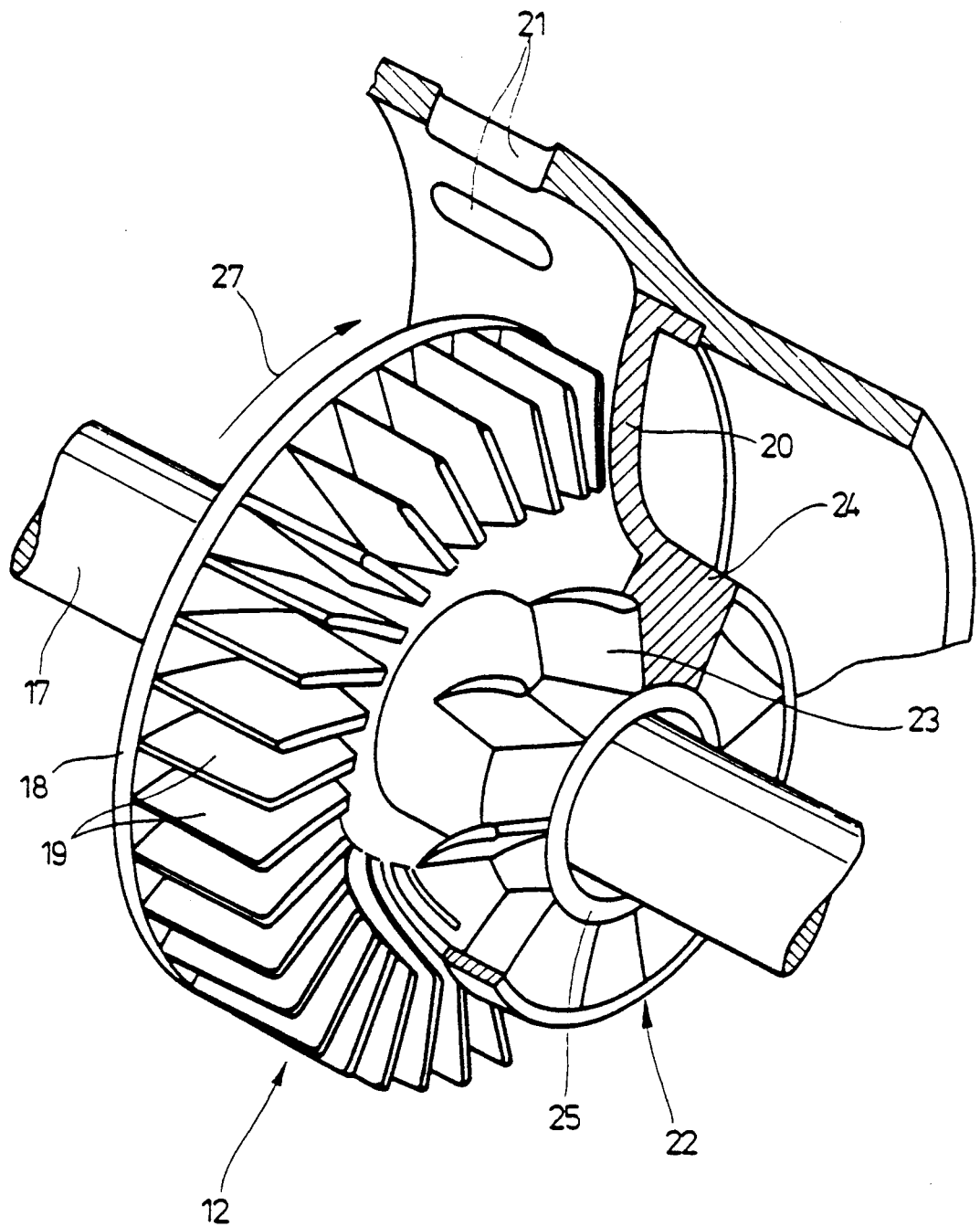
FIG. 2 is a perspective view of a radial fan and a pre-spinning grate of the inventive hand machine tool of FIG. 1.

The perspective view of FIG. 2 clearly illustrates the construction of the pre-spinning grate 22. In the partially shown pres pinning grate 22 the arrangement of the air guiding vanes 23 with respect to the radial plane extending longitudinally of the axis of the motor shaft can be clearly recognized. The air guiding vanes 23 are therefore inclined or set with respect to the axis of the motor shaft at a small acute angle relative to the circumferential direction of the radial fan 12. The rotary direction of the radial fan 12 is identified in FIG. 2 with the arrow 27. Due to this adjustment of the air guiding vanes 23 the counter spin flows against the fan vanes 19 of the radial fan 12. Therefore, with the not changed vane geometry of the fan vanes 19, more power to the throughflowing air is transmitted than in the spin-free flow. It is to be recognized that a co-spin flow leads to a reduction of the power transmission, and a normal radial fan which is not provided with the pre-spinning grate 22 has certain fraction of the co-spin due to rotation of the rotor. Therefore the pressure increase and the increase in the volume stream due to the pre-spinning grate 22 is substantially amplified, since it compensates the conventionally, power reducing co-spin.

It will be understood that each of the elements described above, or two or more together, may also find a useful application in other types of constructions differing from the types described above.

While the invention has been illustrated and described as embodied in a hand machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A hand machine tool, comprising a machine housing; an electric motor; a radial fan driven by said electric motor and having an aspirating region; and a non-rotatable pre-spin grate located stationarily relative to said machine housing in said aspirating region of said radial fan directly upstream said radial fan as considered in an air flow direction and formed so that a supply air to said radial fan is deviated against a rotary direction of said radial fan.

2. A hand machine tool as defined in claim 1; wherein, said electric motor and said radial fan are arranged in said machine housing.

3. A hand machine tool as defined in claim 2, wherein said electric motor has a stationary stator, a motor shaft supported in said housing and a rotor rotated by said motor shaft, said radial fan having a plurality of fan vanes which are arranged on said motor shaft near an end side of said electric motor and operates so that said fan vanes aspirate a cooling air through said electric motor and pump the cooling air radially outwardly of said machine housing.

4. A hand machine tool as defined in claim 1, wherein, said electric motor has a motor shaft, said pre-spinning grate having an outer ring which is mounted on said motor shaft, an inner ring which concentrically directly surrounds said motor shaft, and a plurality of radially extending air guiding vanes located between said inner ring and said outer ring, said air guiding vanes having vane planes which are adjusted relative to radial planes extending along an axis of said motor shaft.

5. A hand machine tool as defined in claim 1, wherein said pre-spinning grate is formed as a one piece member composed of a synthetic plastic material.

6. A hand machine tool as defined in claim 4; and further comprising a cover ring which is mounted on said machine housing, said cover ring covering an end side of said fan vanes which faces said aspirating region in a radial region which surrounds said aspirating region so as to form vane passages.

7. A hand machine tool as defined in claim 6, wherein said outer ring of said pre-spinning grate is mounted on said cover ring.

8. A hand machine tool as defined in claim 6, wherein said outer ring of said pre-spinning grate is formed of one piece on said cover ring and axially extends from the latter.

9. A hand machine tool as defined in claim 4, wherein said electric motor has a rotor, said outer ring of said pre-spinning grate having a diameter substantially corresponding to an outer diameter of said rotor.

10. A hand machine tool as defined in claim 1, wherein said pre-spinning grate has between six and twelve air guiding vanes which are arranged with gaps therebetween.

11. A hand machine tool as defined in claim 1, wherein said electric motor has a stator with a stator winding having a winding head, said pre-spinning grate extending closely to said winding head of said stator winding.

12. A hand machine tool as defined in claim 1, wherein, said radial fan has an air outlet end, said machine housing being provided with air outlet slots arranged near said air outlet end of said radial fan and having surface normals extending substantially radially.

13. A hand machine tool as defined in claim 1, wherein said electric motor is a commutator motor and has a commutator, said radial fan being arranged at a side of said electric motor which faces away of said commutator.

* * * * *